United States Patent [19]
Bunclark et al.

[11] 3,821,337
[45] June 28, 1974

[54] PROCESS FOR CONTROLLED CURING OF FOAMS

[75] Inventors: Edward J. Bunclark, Dollard des Ormeaux; Warrington C. Harrison, Beaconsfield, both of Canada; Eric O. Forster, Scotch Plains, N.J.

[73] Assignee: Esso Research and Engineering Company, Linden, N.J.

[22] Filed: May 7, 1973

[21] Appl. No.: 357,730

[52] U.S. Cl............ 264/26, 260/2.5 FP, 260/2.5 F, 264/47
[51] Int. Cl. ............................................. B29c 6/04
[58] Field of Search................. 264/26, DIG. 2, 47; 260/2.5 FP, 2.5 F

[56] References Cited
UNITED STATES PATENTS

| | | | |
|---|---|---|---|
| 2,406,714 | 8/1946 | Strickland, Jr. | 264/26 |
| 3,519,517 | 7/1970 | Dench | 264/26 |
| 3,740,358 | 7/1973 | Christie et al. | 260/2.5 FP |

Primary Examiner—M. J. Welsh
Attorney, Agent, or Firm—Joseph J. Dvorak

[57] ABSTRACT

A process for preparing a foamed phenol-aldehyde insulating board is provided in which a foamable resole resin having less than 15 wt. percent water is mixed with boric anhydride and then foamed and cured at a foam temperature above about 55° C. Thereafter the foamed resin is heated by microwave energy thereby postcuring the foamed resin board.

6 Claims, 1 Drawing Figure

PATENTED JUN 28 1974
3,821,337
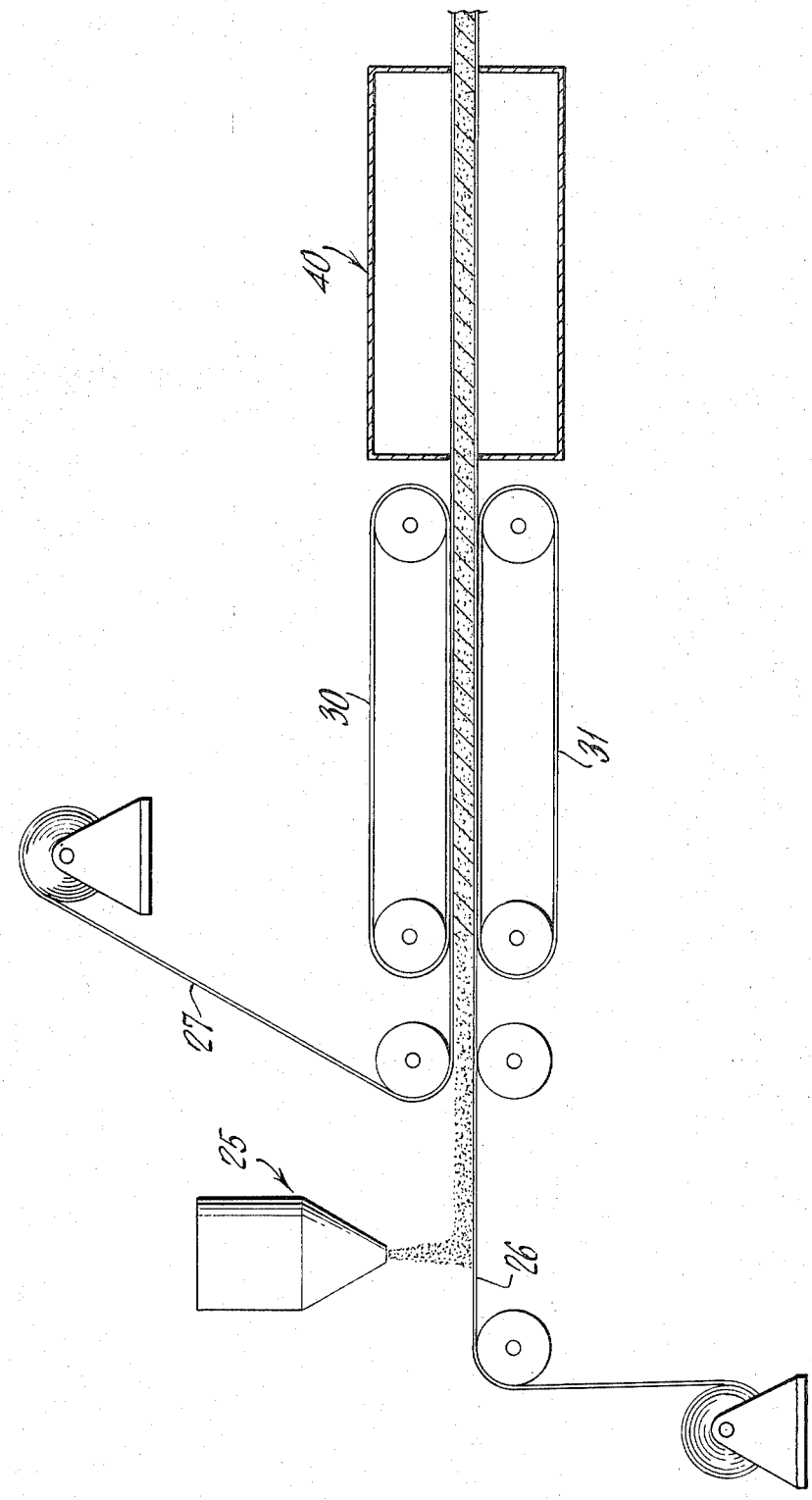

3,821,337

PROCESS FOR CONTROLLED CURING OF FOAMS

BACKGROUND OF THE INVENTION

The present invention relates to improved multicellular foamed elements of thermoset phenol aldehyde resins such as phenol formaldehyde resins. More particularly the instant invention relates to improved phenolic foam insulating boards having improved mechanical strength and flame retarding properties.

The insulating properties of foamed plastic materials are well known. Indeed, one of the most frequently cited advantages of foamed thermoset phenol formaldehyde resins is their very low thermal conductivity. Notwithstanding the extremely desirable insulating value of such foamed resins, commercial exploitation of their insulating properties has been somewhat inhibited for lack of an economical process that will uniformly produce consistently high quality phenolic foam materials. For example, the low thermal conductivity of foamed thermoset phenol formaldehyde materials makes them particularly suited for insulating boards used in building structures, such as walls and roof structures. However, such insulating materials, particularly when used as roofing insulation, typically must have sufficient strength to support bitumenized felt roofing, asphalt, gravel and the like. Additionally, the boards should have sufficient strength to support the weight of a person or persons that from time to time may be required to work on the roof and hence walk on the coated insulating boards. In order to have the required strength the boards have to be more dense than foam products that do not have to support such persons and materials. Thus, a board which is to be used on a roof deck has to have a density between 3 and 3½ pounds/cubic foot. On the other hand, structures which do not have to be walked upon or do not have to support roofing materials only require a density of about 2 to 2½ pounds/cubic foot.

In addition to the density criteria for such structural building elements other criteria must be met. For example, the insulating board should be able to resist mechanical abrasion. Easily abraded foam boards generally have a non-uniformly textured cell structure with a relatively high number of open cells. The open cells apparently are formed by steam and other volatile material escaping during the forming. Thus, control of the forming reaction will affect the ultimate properties of the foam. Additionally, resistance to mechanical abrasion can be achieved, in part, by sandwiching the foam between a protective sheet such as paperboard. In order to achieve the full benefits of such a protective skin, however, it must remain firmly bonded to the foam and not become loose or separate from the foam core. Thus the conditions under which the resin is foamed and the cover material applied are significant determinants of the quality of the board produced.

Also an important factor to foam quality and production rate is the conditions under which the thermosetting of the foam takes place. The thermosetting step involves crosslinking of a polymeric skeletal structure of the foam. This crosslinking step is typically a very slow process; yet, it is an important and critical one because the extent of crosslinking affects certain physical characteristics of the foam.

SUMMARY OF THE INVENTION

According to the present invention a high quality foamed phenol-aldehyde insulating board is economically produced by depositing a mixture of a foamable resole resin having less than 15 wt. percent water and from 5 to 20 wt. percent of boric anhydride on a carrier sheet, advancing the carrier sheet to mold confining members, maintaining the temperature of the resin above about 55° C whereby the resin is foamed and cured and thereafter heating the foamed resin with microwave energy thereby facilitating the crossliking of the skeletal structure of the foam and enhancing the mechanical properties of the foam.

In the practice of the present invention the resole resins contain less than 15 wt. percent water and preferably from about 12 wt. percent to about 15 wt. percent. With such a resin it is particularly preferred to mix from about 10 percent to about 15 percent by weight of boric anhydride. Additionally it is preferable that the carrier sheet be sufficiently porous so as to permit 100 cc of air to pass through one square inch of sheet in less than 20 seconds. Use of relatively porous carrier sheets sandwiching the foam permits the escape of volatile materials during postcuring with microwave energy thereby improving the quality of the insulation board produced. Most generally microwave energy is supplied to the foamed board in amounts ranging from 0.1 to 5 kilowatts per square foot of board and preferably in an amount from about 0.2 to 2.5 kilowatts per square foot of board.

BRIEF DESCRIPTION OF THE DRAWING

The accompanying FIGURE is a schematic illustration of the process of the present invention.

DETAILED DESCRIPTION

In a preferred method of practicing the present invention a foamable one-step resole resin is employed. The resole resin is a condensation product of a monohydric phenol and an aldehyde. It is particularly preferred to form the phenol resin by condensing phenol, per se, as a 90 percent aqueous solution with formaldehyde as a 37 percent aqueous solution in the presence of an alkaline catalyst such as 30 percent aqueous sodium hydroxide. This curable phenol formaldehyde resin or resole resin sometimes is referred to as an A-stage reaction product. In any event it is particularly important that the resole prepared contain less than 15 wt. percent water and preferably from about 12 percent to about 15 percent by weight of water.

The foamable resole resin of the present invention incorporates a surfactant to reduce the surface tension of the resin, thereby aiding in the stabilization of the growing cells. The amount of surfactant normally employed ranges from about 0.5 percent to about 5 percent by weight of liquid resin. Typical surface active agents that can be employed in the practice of the present invention include condensation products of alkaline oxides, such as ethylene oxide, with alkyl phenols, fatty acids and like materials. Commercially available fatty acid monoesters of polyethylene ethers of sorbitan can be employed. Thus, Tween 20, a commercial grade of ethylene polyether sorbitan monolaurate; Tween 60, a commercial grade of polyethylene ether sorbitan monostearate; and Tween 80, a commercial grade of polyethylene ether sorbitan monooleate obtainable from Atlas Powder Company, Wilmington, Del., are useful surfactants in the instant process. Technical grades of dodecyl dimethylamine oxide, olyl dimethylamine oxide sold under the names: Aminox A—O, O—O and C—O, respectively by the Onyx Oil and Chemical Company in New York, and the technical grade of alkyldimethylbenzyl ammonium chloride by the same company under the designation Aminox T, also may be employed.

Foamable resins typically incorporate blowing agents. The blowing agent employed in the foamable resole resin of the instant invention includes vaporizable hydrocarbons such as normal paraffins, alcohols, ethers, fluorocarbons and the like. It is especially preferred to employ normal pentane as a blowing agent in an amount ranging from about 5 percent to about 10 percent by weight based on the weight of resin.

Acidic curing agents are employed in foamable resole resin compositions. The acidic curing agent used in the instant process may be any strong acid compound which is conventionally used in curing phenolic foams, such as Lewis acids, hydrochloric acids, sulfuric acid, nitric acid, phosphoric acid, pyrophosphoric acid, polyphosphoric acid, sulfonic acids, hydrobromic acid, hydroiodic acid and trichloroacetic acid. The term "sulfonic acids" is intended to include organic sulfonic acids as, for example, phenol sulfonic acid, chlorosulfonic acid, ethane sulfonic acid, mixed alkane sulfonic acid, metabenzene disulfonic acid, 1-naphthol-8-sulfonic acid, anthroquinone-2-sulfonic acid, anthroquinone-2,7-di-sulfonic acid, bromobenzene-4-sulfonic acid, metacresol sulfonic acid and resorcinol sulfonic acid. All such acids are used in aqueous solution. Especially preferred is a 40 percent by weight of powdered toluene sulfonic acid and 20 percent sulfuric acid, the balance water. The acid catalyst is used in an amount ranging from 8 percent to about 15 percent by weight and preferably about 15 percent by weight of resin.

In order to prepare foamed board having the requisite density, strength, and fire retardant properties, the ultimate foam should have below about 5 percent by weight of free water. Moreover, in order to effectively cure the foam by microwave energy, it is particularly important that the amount of free water in the foam be less than about 10 percent by weight. If too much free water is present, not only is it particularly difficult to adequately control the cellular structure during foaming, but upon postcuring blistering or other undesirable changes can occur. Thus, by employing an A-stage resole resin that has a water content below 15wt. percent and by mixing boric anhydride with the resin prior to foaming, the amount of free water in the foam is controlled. Preferably, 5 percent to 20 percent by weight boric anhydride is employed, although it is particularly preferred to use from about 10 percent to about 15 percent by weight of boric anhydride.

In addition to controlling the amount of free water in the foam, boric anhydride serves to accelerate the foaming and curing reaction. Additionally, the boric acid formed as a result of the hydrolysis reaction enhances the fire retardant properties of the foam.

In conjunction with the use of boric anhydride, optionally anhydrous alkali and alkaline earth metal sulfates may be incorporated in the foam formulation. These salts will combine with water in the formulation, thereby enhancing the properties of the foam. Generally, these salts are added in amounts ranging from about 7 percent to about 10 percent by weight based on the resin.

In the practice of the present invention a plasticizer is generally employed in the foamable resole formulation. Suitably, a plasticizer is present in an amount ranging from about 10 percent to about 20 percent by weight of the resin, and preferably about 15 percent by weight of the resin. Plasticizers that are preferred include aromatic naphthalenic fractions of mineral oil sold under the name Polymerol, and aromatic hydrocarbon concentrate derived from petroleum and sold under the trade name Dutrex by Shell Chemical Company, New York.

To control the rate of foaming of the resins as well as the quality of the product formed upon foaming, the resin is advanced to confining members which limit the thickness of the ultimate product produced. These confining members should be at curing temperatures of the foam, i.e. they should be at temperatures ranging from about 60° to about 100° C. If the confining members are not at curing temperatures, the foam will collapse producing a friable and commercially non-acceptable product. Additionally, the rate at which the insulation board can be produced will be severely limited.

The process of the present invention will be better understood by reference to the FIGURE wherein 25 represents a high intensity mixer. The individual components of the foamable resole resin mentioned above are delivered to the mixer by metering lines not shown and mixed therein with boric anhydride. To reduce the number of metering lines some of the components can be pre-mixed. For example the boric anhydride can be suspended in plasticizer and the suspension metered into the mixer. After mixing the liquid phenol aldehyde resole, acid catalyst blowing agent, boric anhydride and plasticizer, and optionally the anhydrous metal salt, the mixture is deposited on carrier sheet 26. The carrier sheet consists of flexible film-like material such as paper. A second cover sheet 27 is laid over the top of the mix. Additionally, this second sheet is placed on the foamable resin under the nip of a roller, thereby distributing the foam formulation evenly between the two sheets.

In the practice of the present invention, it is particularly important that the carrier sheet and the cover sheet be made of highly porous materials such as cellulosic felt, kraft paper, fiberglass and the like. Indeed the carrier sheet should be sufficiently porous so as to permit 100 cc of air to pass through 1 square inch of sheet in less than 20 seconds as measured by ASTM Test Method D-726-58. The porosity of the sheet permits the escape of volatile material during curing and especially during postcuring with microwave energy.

In addition to providing a surface in which to advance the mixed resin through the various processing steps, the carrier and cover sheet become intergrally bonded to the foamed product and serve to protect the foam from abrasion and indentation In any event, the carrier sheet is advanced to mold confining members to limit the thickness of the board produced. While being so advanced to the mold, the deposited formulation foams. The mold confining members 30 and 31 are maintained at curing temperatures, i.e., at about 60° to about 100° C. Following contact with the confining members, the foam hardens. Immediately subsequent to foaming and hardening, the board is advanced to station 40 to be exposed to electromagnetic radiation for postcuring. At station 40 it is particularly preferred that this phase of the heating shall be carried out with microwaves having a frequency ranging between 100 and 10,000 MHz, with the preferred range of from about 800 to 6,000 MHz. The selection of the most preferred frequency will depend, of course, on the thickness of the object to be treated. For example, if it is desirous to produce a foam board having a 3 inches thickness, one would use around 900 MHz; whereas, it would be preferred to use 2,500 MHz for boards of 2 inches or less in thickness. Selection of the proper frequency is also related to the penetration depth of the radiation, and the extent of curing desired to produce given physical properties. Similarly the amount of energy supplied will depend upon the thickness of the board, the through-put rate and its cure rate. Generally from 0.1 to 5 kilowatts per square foot of board and preferably 0.2 to 2.5 kilowatts per square foot of board one inch thick will be supplied.

In the practice of the instant invention, the foam board is carried on a conveyer through a resonating cavity designated generally as station 40 to expose the foam to the requisite microwave energy. The size of the cavity of course will depend upon the line speed of the conveyer and the desired residence time in the cavity. For example, if a conveyor is working at a line speed at 8 ft. per minute the cavity would have to be six feet long to allow the foam board a two minute residence time within the cavity. The principle of such a resonating cavity for microwave treating of materials is set forth in U.S. Pat. No. 3,434,220, for example, and that patent is incorporated herein by reference.

As already pointed out, if microwave energy is used to cure the phenolic foam board, the board should be formed from a foamable resole resin containing less than about 15 percent by weight of water and having about 5 to 20 percent of boric anhydride incorporated therein, otherwise the board contains significant amounts of water and other volatiles present which on postcuring result in the formation of blow holes and channels formed by their escape, thereby resulting in a product which has a non-uniform cellular structure. Additionally, when such larger quantities of water are present the surface of the foam board tends to blister. It is for this blistering reason also that it is particularly preferred that the carrier sheet and the cover sheet material be of a highly porous material such as kraft paper, cellulosic felt, fiber glass, and the like.

Additionally, it is important in the practice of the instant invention that the temperature of the foam as it enters the microwave resonating cavity be of above about 55° C. and preferably in the range of about 60° to about 80° C. If the foam is at a lower temperature the residence time in the cavity for curing the foam necessarily is longer thereby detracting from the economical advantages achieved in accordance with the instant invention. Most generally the foam is subjected to microwave energy for a time sufficient to promote postcuring of the foam. The postcuring can be evidenced by the amount of volatiles produced or the loss in weight of the foam or improvement in physical properties for example. An especially simple technique is to subject the foamed board to microwave frequencies for a time sufficient to increase the temperature of the board to the range of about 80° to about 100° C.

The following examples serve to illustrate the manner in which the process of this invention may be carried out as well as the benefits derived therefrom.

Examples 1-4

In the following examples the foamable resole resin contained less than 15 wt. percent water and included 10 phr (parts per hundred parts of resin) of the blowing agent, 12phr of catalyst, 5 phr of surfactant and 15 phr of plasticizer. With the foamable resole resin was mixed 15 phr of boric anhydride. The mold temperature was maintained at 60° C and 2.5 kilowatts of microwave energy was supplied for postcuring. Other conditions and results are set forth in Table I.

TABLE I

| Example | Carrier Sheet | | In Mold | | In Microwave Cavity | | Comments |
| --- | --- | --- | --- | --- | --- | --- | --- |
| | Material | Porosity | Time Mins. | Foam Temp °C. | Time, Mins. | Foam Temp.,°C. | |
| 1 | 15 lb. felt | 7 sec./100cc of air | 3 | 55° | 2 | 81° | Because of lower foam temperature in the mold volatile diffusion occurred primarily in the cavity. |
| | | | | | 4 | 86° | |
| | | | | | 6 | 99° | |
| 2 | 48 lb. felt | 4 sec./100cc of air | 3 | 60° | 2 | 92° | Postcuring completed after 4 minutes. No blistering of porous skin. |
| | | | | | 4 | 90° | |
| | | | | | 6 | 82° | |
| 3 | fiberglass fabric | completely porous | 3 | 65° | 2 | 85° | No blistering. The completely porous skin and higher temperature in the mold reduced the amount of volatiles to be freed during postcuring. |
| | | | | | 4 | 88° | |
| | | | | | 6 | 88° | |
| 4 | 15 lb. felt-asphalt saturated | 400 Sec/100cc of air | 3 | 65° | 2 | 93° | Blistering of the cover occurred on postcuring due to the water and other volatiles that were retained by the low porosity carrier sheet. |
| | | | | | 4 | 94° | |
| | | | | | 6 | 110° | |

Examples 5-6

In these examples a relatively porous carrier sheet of white blotting paper was employed. The composition of the foamable resin was similar to that in the preceding examples except that the amount of boric anhydride was cut in half in one test with boric acid added to offset the decrease in boric acid present in the foam. The results are summarized in Table II below.

TABLE II

| Example | $B_2O_3$, phr | $H_3BO_3$ | In Mold | | In Microwave Cavity | |
|---|---|---|---|---|---|---|
| | | | Time Mins. | Temp. °C | Time | Temp. °C |
| 5 | 15 | 0 | 3 | 70° | 2 | 88° |
| | | | | | 4 | 92° |
| | | | | | 6 | 97° |
| 6 | 7.5 | 7.5 | 3 | 50° | 2 | 90° |
| | | | | | 4 | 94° |
| | | | | | 6 | 100° |

As can be seen, decreasing the amount of boric anhydride reduces the temperature the foam achieves in the mold. Additionally, it affects the quality of the board produced since considerable postcuring is required to expel the volatile materials present and promote crosslinking of the polymer structure.

What is claimed is:

1. A process for making a foamed phenolic resin board comprising:

depositing a mixture of a foamable resole resin having less than 1 wt. percent water and from 5 wt. percent to 20 wt. percent of boric anhydride on a carrier sheet;

advancing the carrier sheet to mold confining members;

maintaining the temperature of the resin above about 55°C whereby the resin is foamed and cured; and thereafter passing the foamed resin through at least one microwave resonance cavity operating at a frequency of about 800 to 6,000 MHz for a time sufficient to postcure the foam.

2. The process of claim 1 wherein a foamable resole resin containing from about 12 wt. percent to 15 wt. percent water is mixed with from about 10 wt. percent to about 15 wt. percent of boric anhydride.

3. The process of claim 1 wherein the carrier sheet is selected from cellulosic fiber, fiberglass, kraft paper and blotter paper.

4. The process of claim 3 wherein the carrier sheet is sufficiently porous to permit the passage of 100 cc of air through one square inch of area in less than 20 seconds as determined by ASTM Test Method D-726-58.

5. The process of claim 1 wherein the mold confining members are maintained at a temperature of about 60° C.

6. In the process of preparing a foamed phenolic board by foaming and curing a resole resin of a phenol and an aldehyde in the presence of boric anhydride, the improvement comprising exposing the foamed and cured board to a microwave frequency of from 800 MHz to about 6,000 MHz for a time sufficient to increase the temperature of the foam to about 100° C.

* * * * *